(12) United States Patent
Walley et al.

(10) Patent No.: US 8,107,890 B2
(45) Date of Patent: Jan. 31, 2012

(54) MULTIPLE FREQUENCY BAND MULTIPLE STANDARD DEVICE WITH REDUCED BLOCKER

(75) Inventors: John Walley, Ladera Ranch, CA (US); Jeyhan Karaoguz, Irvine, CA (US); Brima Ibrahim, Aliso Viejo, CA (US); Arya Reza Behzad, Poway, CA (US); Vinko Erceg, Cardiff by the Sea, CA (US); David Rosmann, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 508 days.

(21) Appl. No.: 12/328,579

(22) Filed: Dec. 4, 2008

(65) Prior Publication Data

US 2010/0142508 A1    Jun. 10, 2010

(51) Int. Cl.
*H04B 1/38* (2006.01)
*H04J 3/22* (2006.01)
(52) U.S. Cl. .......................................... 455/73; 370/465
(58) Field of Classification Search .................... 455/73; 370/464–467
See application file for complete search history.

(56) References Cited

U.S. PATENT DOCUMENTS

| 6,456,611 B1* | 9/2002 | Hu et al. ........................ 370/342 |
| 6,937,612 B1* | 8/2005 | Mauger et al. ................. 370/465 |
| 2008/0232299 A1* | 9/2008 | Mosig ............................ 370/328 |

* cited by examiner

*Primary Examiner* — David Mis
(74) *Attorney, Agent, or Firm* — Garlick Harrison & Markison; Timothy W. Markison; Jessica W. Smith (57) ABSTRACT

A device includes a transcevier and a processing module. The transceiver is operable to receive a wireless communication request from a requesting wireless communication device and to convert the wireless communication request into a baseband or near baseband request signal. The processing module is operable to determine multiple frequency band multiple standard (MFBMS) capabilities of the requesting and the target wireless communication devices based on the baseband or near baseband request signal. When the devices have at least two frequency band standards in common, the processing module allocates a communication resource of one of the two frequency band standards for a first communication path from the requesting wireless communication device to the target wireless communication device and allocates a communication resource of another one of the two frequency band standards for a second communication path from the target wireless communication device to the requesting wireless communication device.

22 Claims, 4 Drawing Sheets

MULTIPLE FREQUENCY BAND MULTIPLE STANDARD DEVICE WITH REDUCED BLOCKER

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to transceivers that operate in such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Many wireless transceivers are able to support multiple communication standards, which may be in the same frequency band or in different frequency bands. For example, a wireless transceiver may support Bluetooth communications for a personal area network and IEEE 802.11 communications for a Wireless Local Area Network (WLAN). In this example, the IEEE 802.11 communications and the Bluetooth communications may be within the same frequency band (e.g., 2.4 GHz for IEEE 802.11b, g, etc.). Alternatively, the IEEE 802.11 communications may be in a different frequency band (e.g., 5 GHz) than the Bluetooth communications (e.g., 2.4 GHz). For Bluetooth communications and IEEE 802.11b, (g), etc. communications there are interactive protocols that appear to the user as simultaneous implementation, but is actually a shared serial implementation.

Regardless of which standard a transceiver is currently support, if the standard requires full duplex communications, the transceiver must include a technique to minimize the adverse affects of transmissions of RF signals (i.e., blocker signals) upon receptions of RF signals. Many standards address this by providing a transmission frequency and a reception frequency (e.g., 1920-1980 MHz for uplink WCDMA communications and 2110-2170 MHz for downlink WCDMA communications). While standardized transmission and reception frequencies eliminate direct overlap, the transmitted signal still adversely affects the received signal when the signal strength difference is substantial (e.g., 40 dBm or more).

To further reduce the blocker signal within the receiver section, the receiver section includes an RF blocking circuit, a duplexer, and/or baseband circuitry to filter out the blocker signal. For a transceiver that supports multiple standards in multiple frequency bands, multiple RF blocking circuits, multiple duplexers, and/or multiple baseband circuits may be required to reduce the adverse affects of the blocker signal on the received RF signal. Note that a cordless phone, which operates in a single standard, may use one frequency for the transmit path and another frequency for the receive path to obtain a reduction in transmitter interference.

Therefore, a need exists for an improved technique for reducing the adverse affects of a blocker signal on the received RF signal in a multiple frequency band multiple standard transceiver.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
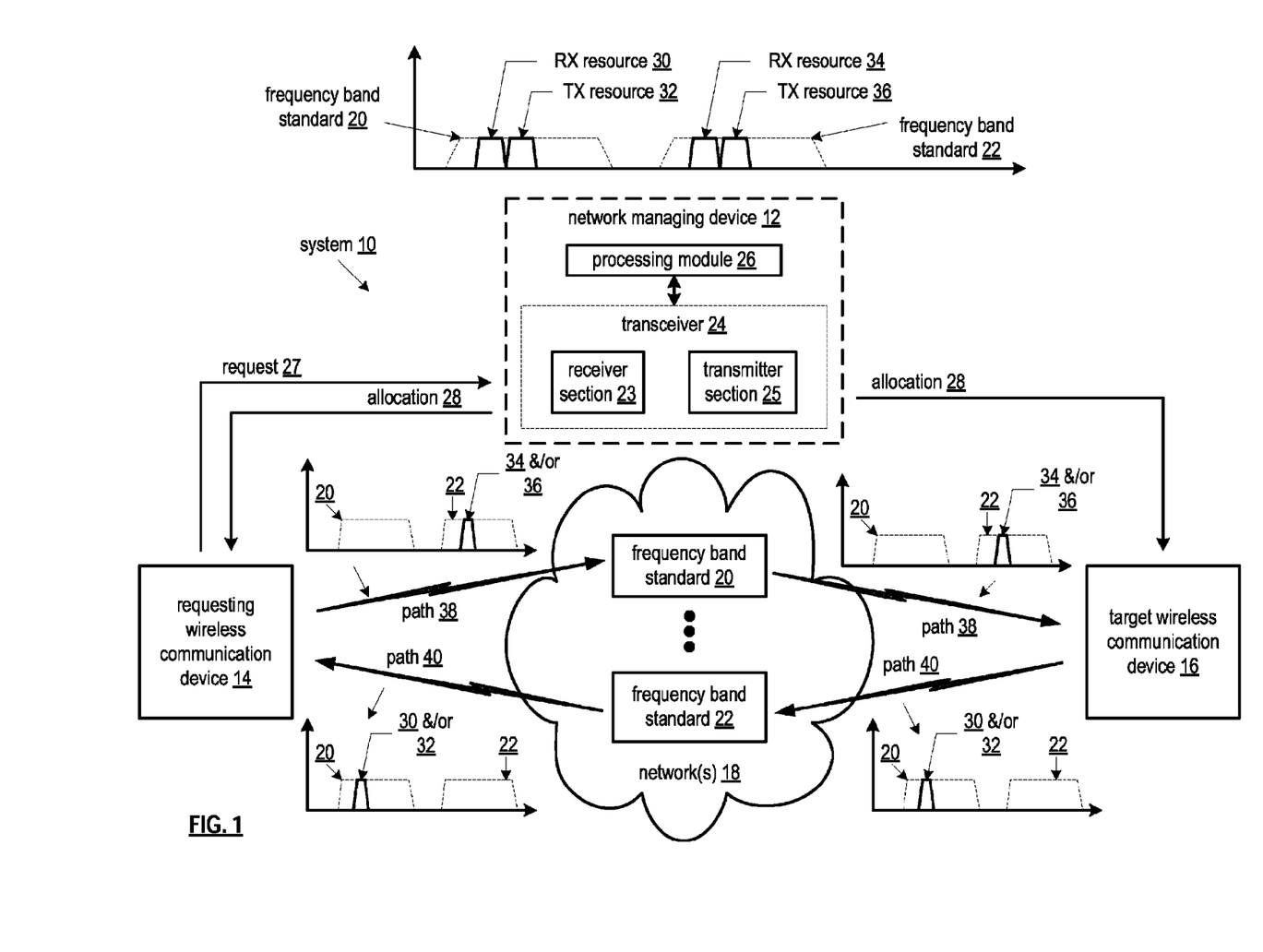
FIG. 1 is a schematic block diagram of an embodiment of a system that includes multiple frequency band multiple standard (MFBMS) devices in accordance with the present invention.

FIG. 1 is a schematic block diagram of an embodiment of a system 10 that includes a network managing device 12 a plurality of wireless communication devices 14 and 16, and one or more networks 18. The network managing device 12, which may be implemented on one or more integrated circuits, includes a transceiver 24 and a processing module 26. The transceiver 24 includes a receiver section 23 and a transmitter section 25. The processing module 26 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 26 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 26 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 26 executes, hard coded and/or operational instructions corresponding to at least some of the steps and/or functions illustrated in FIGS. 1-4.

In operation, a requesting wireless communication device 14 (which may be a cellular telephone, a two-way radio, a computer, a laptop, a WLAN station, a WLAN access point, a personal area network transceiver, a wide area network transceiver, a mobile data device, and/or any other type of device that is capable of wireless communication) transmits a wireless communication request 27 to the network managing device 12. The wireless communication request 27 includes identity of the requesting wireless communication device, identity of the target wireless communication device (e.g., device 16), overhead information in accordance with one of a plurality of standards, and payload information. The payload information includes a message for initiating a wireless communication and may further include the multiple frequency band multiple standard (MFBMS) capabilities of the requesting wireless communication device 14. The payload information may also include the MFBMS capabilities of the target wireless communication device 16. Alternatively, the payload information may include the message for initiating the wireless communication and information indicating a preference for establishing a first communication path 38 and a second communication path 40 between the requesting and target wireless communication devices 14 and 16.

The network managing device 12 (which may be a component in the network switching subsystem, a mobile switching center server, public switched telephone network server, internet server, and/or stand-alone device coupled to the network(s)) receives the wireless communication request 27 via the receiver section 23 of the transceiver 24. The receiver section 23 converts the wireless communication request 26 into a baseband or near baseband request signal.

In an embodiment, the receiver section 23 may amplify the request signal 27 to produce an amplified inbound RF signal. The receiver section 23 then mixes in-phase (I) and quadrature (Q) components of the amplified inbound RF signal with in-phase and quadrature components of a local oscillation to produce a mixed I signal and a mixed Q signal. The mixed I and Q signals are combined to produce baseband or near baseband request signal, which may include a symbol stream. In this embodiment, the baseband or near baseband request signal includes phase information (e.g., $\pm\Delta\theta$ [phase shift] and/or $\theta(t)$ [phase modulation]) and/or frequency information (e.g., $\pm\Delta f$ [frequency shift] and/or $f(t)$ [frequency modulation]).

In another embodiment and/or in furtherance of the preceding embodiment, the inbound request signal 27 includes amplitude information (e.g., $\pm\Delta A$ [amplitude shift] and/or $A(t)$ [amplitude modulation]). To recover the amplitude information, the receiver section 23 includes an amplitude detector such as an envelope detector, a low pass filter, etc.

The processing module 26 determines the multiple frequency band multiple standard (MFBMS) capabilities of the requesting wireless communication device and the target wireless communication device based on the baseband or near baseband request signal. This may be done in a variety of ways. For example, the processing module 26 may access a look up table based on the identity of the requesting and target wireless communication device to determine their MFBMS capabilities (e.g., which frequency bands the device is capable of operation and, for a given frequency band, which standards the device supports).

As another example, the processing module 26 may interpret the baseband or near baseband request signal to obtain the MFBMS capabilities of the requesting and/or the target wireless communication device. For instance, if the payload of the baseband or near baseband request signal includes the MFBMS capabilities of the requesting and/or target wireless communication device, the processing module 26 retrieves the capabilities from the signal. As a further example, the processing module 26 may query the requesting and/or target wireless communication device to obtain the MFBMS capabilities.

As yet another example, the payload of the baseband or near baseband signal may include information indicating a preference for establishing a first communication path 38 and a second communication path 40 between the requesting and target wireless communication devices 14 and 16. In this instance, the processing module would retrieve specific MFBMS capabilities of the requesting and target wireless communication devices to support the requested path configurations.

When the MFBMS capabilities of the requesting and target wireless communication devices have at least two frequency band standards in common, the processing module 26 allocates a communication resource of one of the two frequency band standards for a first communication path 38 from the requesting wireless communication device to the target wireless communication device. The processing module 26 also allocates a communication resource of another one of the two frequency band standards for a second communication path 40 from the target wireless communication device to the requesting wireless communication device.

The transmitter section 25 of the transceiver 24 converts the allocation information for the first and second paths 38 and 40 into an allocation RF signal 28. The transmitter section 25 transmits the allocation RF signal 28 to the wireless communication devices 14 and 16 in accordance with one of the frequency band standards, a default standard, and/or in accordance with a specified frequency band standard.

As an example, assume that the requesting and target wireless communication devices 14 and 16 have two frequency band standards 20 and 22 in common. In this context, a frequency band standard corresponds to a standard that is defined within a given frequency band (e.g., Bluetooth is a standard defined in the 2.4 GHz frequency band, 1800 MHz GSM is a standard defined in the 1800/1900 MHz frequency band, 900 MHz GSM is a standard defined in the 900 MHz frequency range, etc.). In this example, each frequency band standards 20 and 22 includes a receive (RX) communication resource 30 and 34 and a transmit (TX) communication resource 32 and 36. A communication resource may be one or more channels within a given frequency band and/or one or more slots (TDMA, FDMA, CDMA, etc.) of one or more channels within a given frequency band.

The processing module 26 allocates the RX communication resource 34 and/or the TX communication resource 36 of the second frequency band standard 22 to establish the first communication path 38 for transmissions from the requesting wireless communication device 14 to the target wireless communication resource 16. The processing module 26 also allocates the RX and/or the TX communication resource 30 and/or 32 of the first frequency band standard 20 to establish the second communication path 40 for transmissions from the target wireless communication device 16 to the requesting wireless communication device 14. In this regard, from the perspective a wireless communication device 14 or 16, the transmission frequency is substantially separated from the receive frequency such that the transmission has little to negligible adverse affects on the receiver section 23.

Figures 2, 3:
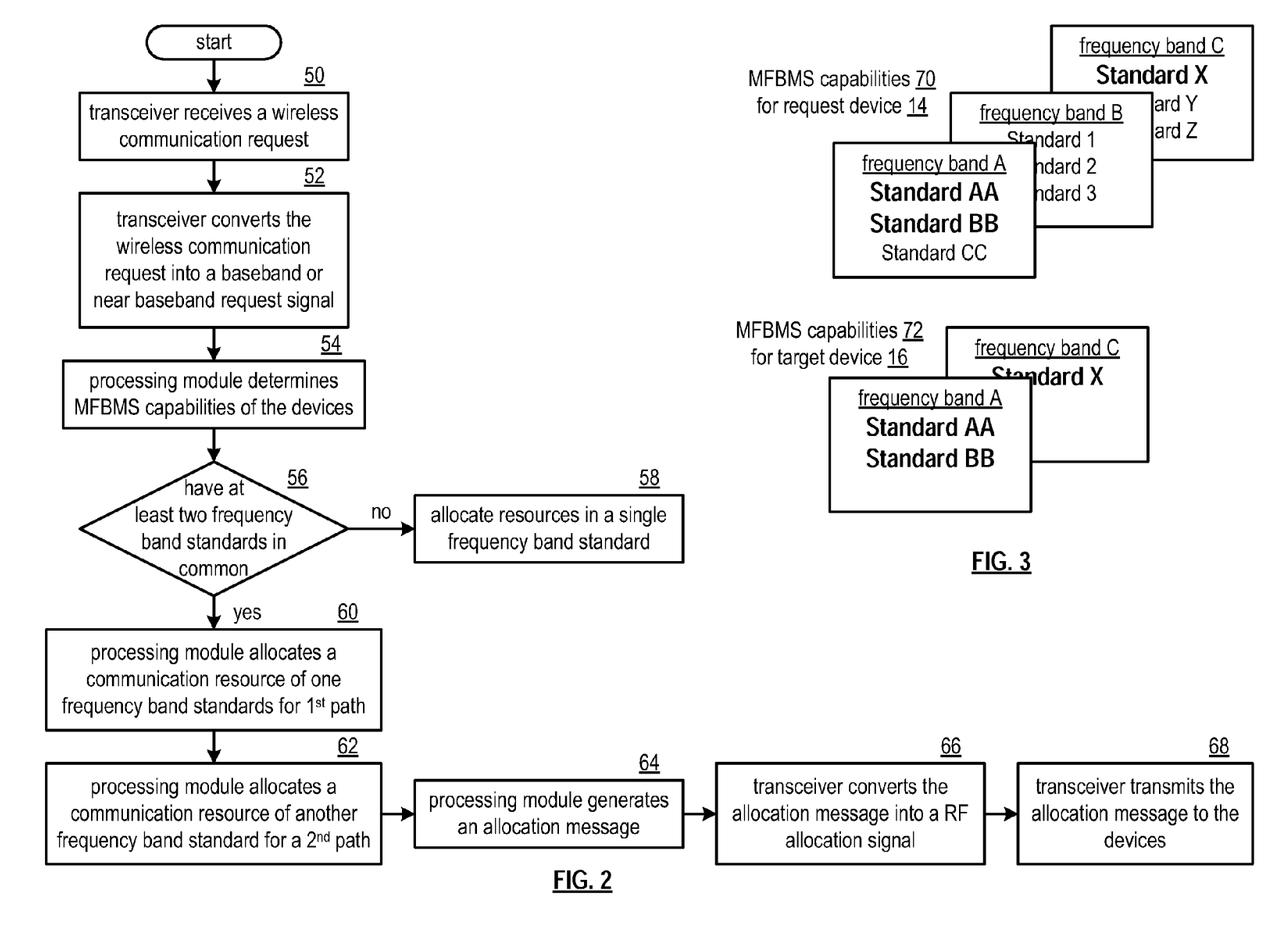
FIG. 2 is a logic diagram of an embodiment of a method for supporting multiple frequency band multiple standard (MFBMS) devices in accordance with the present invention.
FIG. 3 is a diagram of an example of multiple frequency band multiple standard (MFBMS) capabilities in accordance with the present invention.

FIG. 2 is a logic diagram of an embodiment of a method for supporting multiple frequency band multiple standard (MFBMS) devices. The method begins at step 50 where the transceiver 24 receives a wireless communication request 27 from a requesting wireless communication device 14. The wireless communication request 27 includes identity of a target wireless communication device 16 and of the requesting wireless communication device 14. The request 27 may further include other information as discussed above. The method continues at step 52 where the transceiver converts the wireless communication request 27 into a baseband or near baseband request signal, which as a carrier frequency of DC to a few MHz.

The method continues at step 54 where the processing module 26 determines the multiple frequency band multiple standard (MFBMS) capabilities of the requesting wireless communication device 14 and the target wireless communication device 16 based on the baseband or near baseband request signal. As previously mentioned, this may be done by accessing a look up table, interpreting the baseband or near baseband request signal to obtain the MFBMS capabilities of the requesting and/or the target wireless communication devices, and/or querying the requesting and/or the target wireless communication device for the MFBMS capabilities.

The method branches at step 56 depending on whether the devices have at least two frequency band standards in common. If not, the method continues at step 58 where the processing module 26 processes the request by allocating communication resources with a single frequency band standard to support the first and second paths 38 and 40.

If, however, the devices have two or more frequency band standards in common, the method continues at step 60 where the processing module 26 allocates a communication resource of one of the two frequency band standards (e.g., IEEE 802.11 g) for a first communication path 38 from the requesting wireless communication device 14 to the target wireless communication device 16. The method then continues at step 62 where the processing module 26 allocates a communication resource of another one of the two frequency band standards (e.g., 1800 GSM) for a second communication path 40 from the target wireless communication device 16 to the requesting wireless communication device 14. In this instance, a communication resource of the one and of the another one of the two frequency band standards includes at least one transmit channel, at least one receive channel, at least one transmit slot of a transmit channel, and/or at least one receive slot of a receive channel.

In an embodiment, the processing module 26 may allocate at least one transmit communication resource of the one of the two frequency band standards for the first communication path and allocate at least one receive communication resource of the another one of the two frequency band standards for the second communication path. In yet another embodiment, the processing module 26 may process two requests 27 by further allocating at least one receive communication resource of the one of the two frequency band standards for a third communication path from a second requesting wireless communication device to the second target wireless communication device and allocating at least one transmit communication resource of the another one of the two frequency band standards for a fourth communication path from the second target wireless communication device to the second requesting wireless communication device.

In yet another embodiment, the processing module 26 may allocate at least one transmit communication resource of the one of the two frequency band standards for the first communication path, allocate at least one receive communication resource of the one of the two frequency band standards for the first communication path, allocate at least one receive communication resource of the another one of the two frequency band standards for the second communication path, and allocate at least one transmit communication resource of the another one of the two frequency band standards for the second communication path.

FIG. 3 is a diagram of an example of multiple frequency band multiple standard (MFBMS) capabilities 70 for the requesting device 14 and for the MFBMS capabilities 72 for the target device 16. In this example, the requesting device 14 is operable in three frequency bands (e.g., band A, band B, and band C). Within frequency band A, the requesting device 14 supports standards AA, BB, and CC. Within frequency band B, the requesting device supports standards 1, 2, and 3. With frequency band C, the requesting device supports standards X, Y, Z. Note that the frequency bands may be 900 MHz, 1800 MHz, 1900 MHz, 2100 MHz, 2.4 GHz, 5 GHz, 29 GHz, 60 GHz, and/or any other non-licensed frequency spectrum.

In furtherance of this example, the target device 16 is operable in two frequency bands (e.g., A and C). Within frequency band A, the target device 16 supports standards AA and BB. Within frequency band C, the target device 16 supports standard X. In this example, the devices 14 and 16 have three frequency band standards in common: frequency band A-standard AA, frequency band A-standard BB, and frequency band C-standard X. As such, when the processing module is allocating communication resources for the devices, it may be any two of the three frequency band standards for the communication paths 38 and 40.

Figure 4:
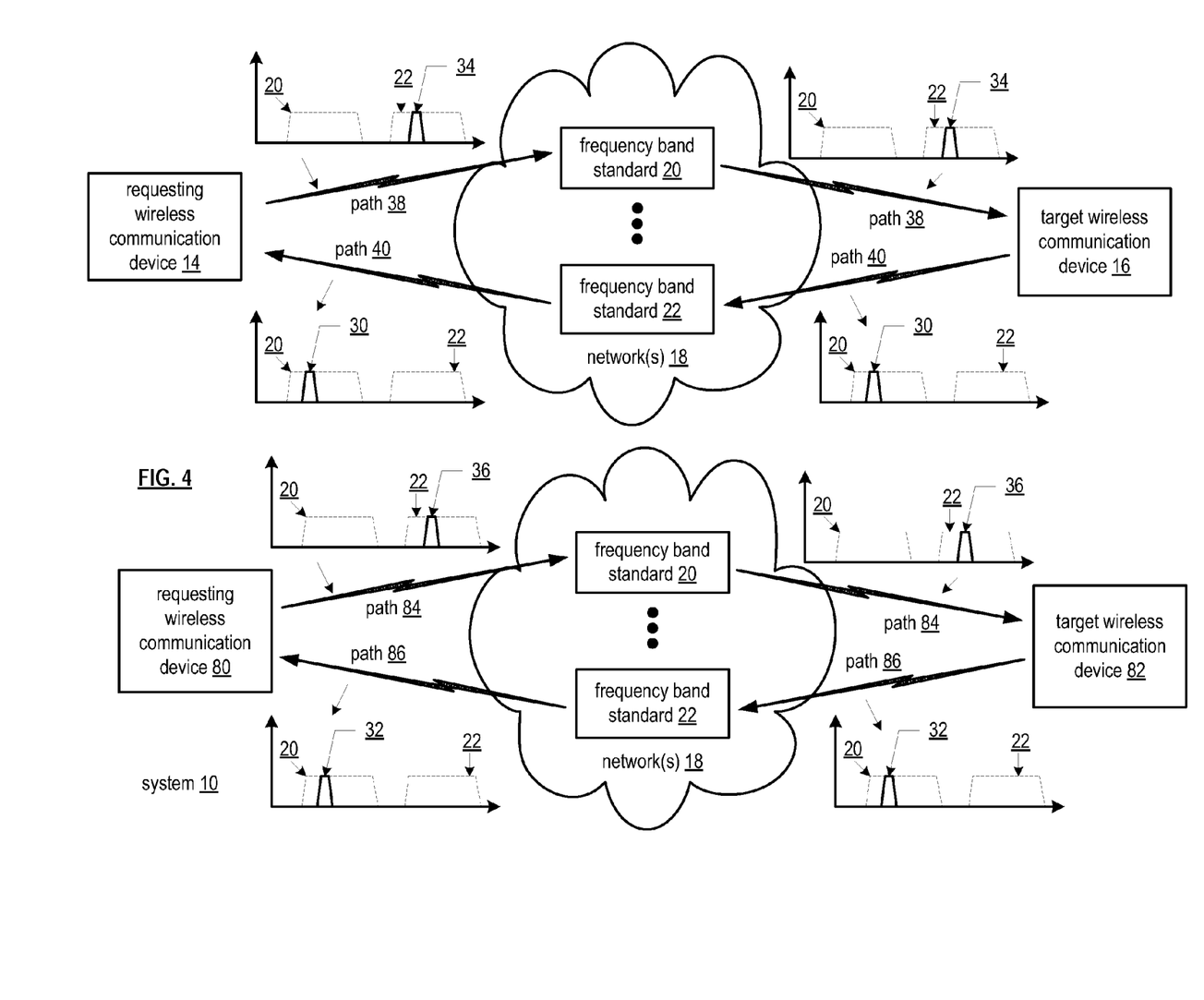
FIG. 4 is a logic diagram of another embodiment of a system that includes multiple frequency band multiple standard (MFBMS) devices in accordance with the present invention.

FIG. 4 is a logic diagram of another embodiment of a system 10 that includes a plurality of multiple frequency band multiple standard (MFBMS) devices 14, 16, 80 and 82. In this embodiment, the requesting device 14 and the target device 16 have a communication set up therebetween using the RX communication resource 34 of the frequency band standard 22 and the RX communication resource 30 of the frequency band 20.

In addition, the second requesting device 80 and the second target device 82 have a communication set up therebetween using the TX communication resource 36 of the frequency band standard 22 for a third communication path 84 and the TX communication resource 30 of the frequency band 20 for a fourth communication path 86. In this embodiment, two communications are supported by the communication resources of two frequency band standards. Note that the TX communication resources may be used for the first communication between devices 14 and 16 and the RX communication resources may be used for the second communication between devices 80 and 82.

Figure 5:
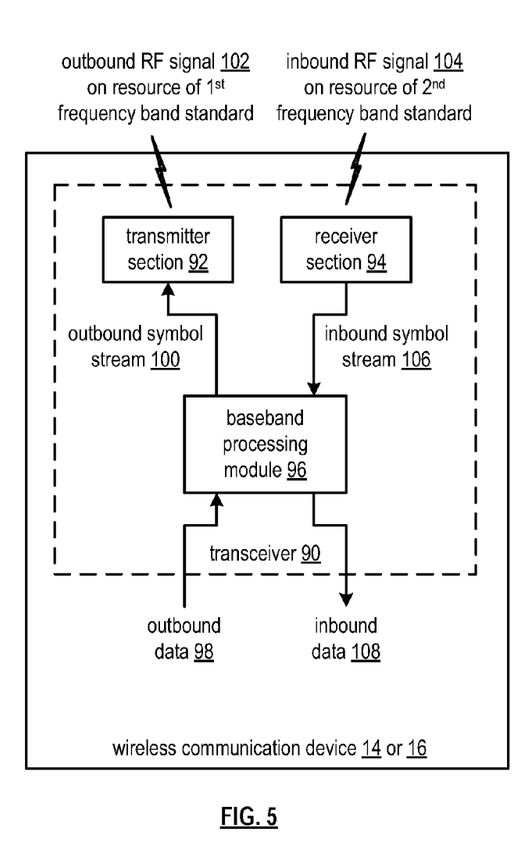
FIG. 5 is a schematic block diagram of an embodiment of a multiple frequency band multiple standard (MFBMS) device in accordance with the present invention.

FIG. 5 is a schematic block diagram of an embodiment of a multiple frequency band multiple standard (MFBMS) device 14 or 16 that includes a transceiver 90, which may be implemented on one or more integrated circuits. The transceiver 90 includes a transmitter section 92, a receiver section 94, and a baseband processing module 96. The baseband processing module 96 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 96 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 96 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 96 executes, hard coded and/or operational instructions corresponding to at least some of the steps and/or functions illustrated in FIGS. 1-6.

To participate in the communication via the first and second communication paths 38 and 40, from the requesting device's perspective, the baseband processing module 96 converts outbound data 98 (e.g., voice data, video data, audio data, text messages, etc.) into the outbound symbol stream 100 in accordance with the one of the two frequency band standards (e.g., one of Bluetooth, IEEE 802.11 WLAN standards, GSM, WCDMA, EDGE, GPRS, HSDPA, HSUPA, 60 GHz protocols, etc.).

The transmitter section 96 converts the outbound symbol stream 100 into an outbound RF signal 102 that has a carrier frequency within the frequency band (e.g., 900 MHz, 1800 MHz, 1900 MHz, 2100 MHz, 2.4 GHz, 5 GHz, 29 GHz, 57-66 GHz, etc.) of the one of the frequency band standards. In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal 102. In another embodiment, the transmitter section includes an oscillator that produces an oscillation. The outbound symbol stream 100 provides phase information (e.g., ±θ [phase shift] and/or θ(t) [phase modulation]) that adjusts the phase of the oscillation to produce a phase adjusted RF signal, which is transmitted as the outbound RF signal. In another embodiment, the outbound symbol stream 100 includes amplitude information (e.g., A(t) [amplitude modulation]), which is used to adjust the amplitude of the phase adjusted RF signal to produce the outbound RF signal.

In yet another embodiment, the transmitter section 92 includes an oscillator that produces an oscillation. The outbound symbol stream 100 provides frequency information (e.g., ±Δf [frequency shift] and/or f(t) [frequency modulation]) that adjusts the frequency of the oscillation to produce a frequency adjusted RF signal, which is transmitted as the outbound RF signal 100. In another embodiment, the outbound symbol stream 100 includes amplitude information, which is used to adjust the amplitude of the frequency adjusted RF signal to produce the outbound RF signal. In a further embodiment, the transmitter section 92 includes an oscillator that produces an oscillation. The outbound symbol provides amplitude information (e.g., ±ΔA [amplitude shift] and/or A(t) [amplitude modulation]) that adjusts the amplitude of the oscillation to produce the outbound RF signal.

The receiver section 94 receives an inbound RF signal 104 via a resource of another one of the frequency band standards and amplifies the signal 104 to produce an amplified inbound RF signal. The receiver section 94 may then mix in-phase (I)

and quadrature (Q) components of the amplified inbound RF signal with in-phase and quadrature components of a local oscillation to produce a mixed I signal and a mixed Q signal. The mixed I and Q signals are combined to produce an inbound symbol stream 106. In this embodiment, the inbound symbol stream 106 may include phase information (e.g., ±Δθ [phase shift] and/or θ(t) [phase modulation]) and/or frequency information (e.g., ±Δf [frequency shift] and/or f(t) [frequency modulation]). In another embodiment and/or in furtherance of the preceding embodiment, the inbound RF signal 104 includes amplitude information (e.g., ±ΔA [amplitude shift] and/or A(t) [amplitude modulation]). To recover the amplitude information, the receiver section 94 includes an amplitude detector such as an envelope detector, a low pass filter, etc.

The baseband processing module 96 converts the inbound symbol stream 106 into inbound data 108 in accordance with the another one of the two frequency band standards. The inbound data 108 may be voice data, video data, audio data, text data, graphics data, and/or a combination thereof.

In addition to facilitating the on-going communication, the baseband processing module 96 may generate a capabilities message regarding the multiple frequency band multiple standard (MFBMS) capabilities of the device during the set up of the communication. The capabilities message may include the capabilities of the requesting device 14 and/of the target device 16 and may be generated as part of the request 27 or in response to a query from the network managing device 12.

The transmitter section 92 converts the capabilities message into an RF capabilities signal and transmits it via a control communication resource, the communication resource of the one of the two frequency band standards, and/or the communication resource of the another one of the two frequency band standards.

Figure 6:
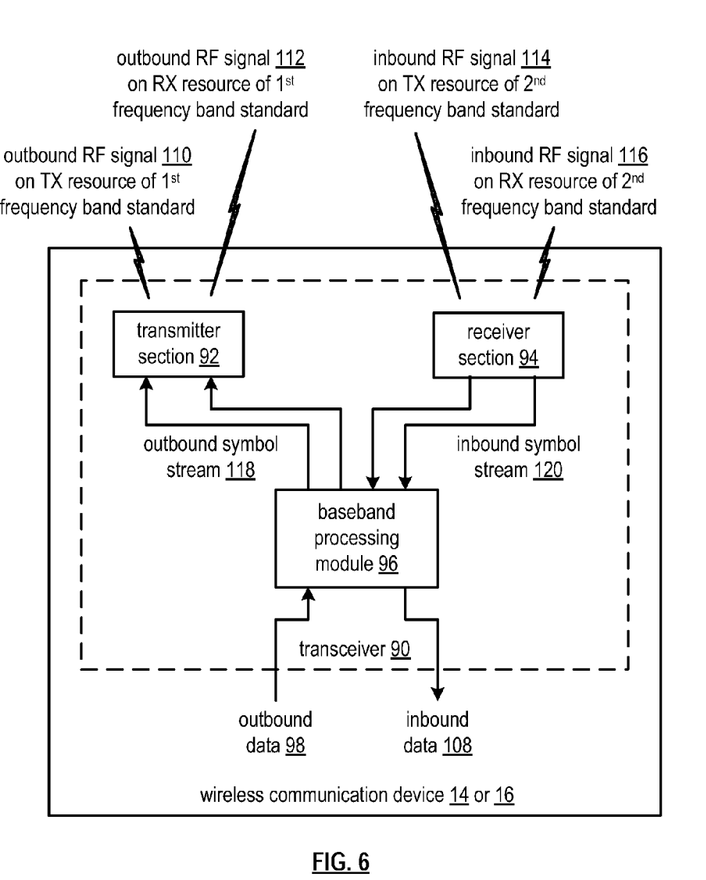
FIG. 6 is a schematic block diagram of another embodiment of a multiple frequency band multiple standard (MFBMS) device in accordance with the present invention.

FIG. 6 is a schematic block diagram of another embodiment of a multiple frequency band multiple standard (MFBMS) device 14 and/or 16 that includes a transceiver 90, which, in turn, includes the transmitter section 92, the receiver section 94, and the baseband processing module 96.

In this embodiment, the transmit section 92 converts a first portion of the outbound symbol stream 118 into a first outbound radio RF signal 110 in accordance with the one of two frequency band standards and convert a second portion of the outbound symbol stream 118 into a second outbound radio RF signal 112 in accordance with the one of two frequency band standards. The transmitter section 92 transmits the first outbound RF signal 110 via a transmit communication resource of the one of the two frequency band standards (e.g., a first frequency band standard) and transmits the second outbound RF signal 112 via a receive communication resource of the one of the two frequency band standards (e.g., the first frequency band standard).

The receiver section 94 receives a first inbound RF signal 116 via a receive communication resource of the another one of the two frequency band standards (e.g., the second frequency band standard) and receives a second inbound RF signal 114 via a transmit communication resource of the another one of the two frequency band standards (e.g., the second frequency band standard). The receiver section 94 then converts the first inbound RF signal 116 into a first portion of the inbound symbol stream 120 in accordance with the another one of the two frequency band standards and converts the second inbound RF signal 114 into a second portion of the inbound symbol stream 120 in accordance with the another one of the two frequency band standards.

The baseband processing module 96 processes outbound data 98 to produce the first and second portions of the outbound symbol stream 118. This may be done in a multiple input multiple output (MIMO) manner or other serial to parallel manner. The processing module 96 also processes the first and second portions of the inbound symbol stream 120 to produce the inbound data 108.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A network managing device comprises:
   a transceiver operable to:
      receive a wireless communication request from a requesting wireless communication device, wherein the wireless communication request includes identity of a target wireless communication device;
      convert the wireless communication request into a baseband or near baseband request signal; and
   a processing module operable to:
      determine multiple frequency band multiple standard (MFBMS) capabilities of the requesting wireless communication device and the target wireless communication device based on the baseband or near baseband request signal;
      when the MFBMS capabilities of the requesting wireless communication device and of the target wireless communication device have at least two frequency band standards in common:
         allocate a communication resource of one of the two frequency band standards for a first communication path from the requesting wireless communication device to the target wireless communication device; and
         allocate a communication resource of an other one of the two frequency band standards for a second communication path from the target wireless communication device to the requesting wireless communication device.

2. The network managing device of claim 1 further comprises:
   the processing module generating an allocation message that identifies the first and second communication paths;
   the transceiver is further operable to:
      convert the allocation message into a radio frequency (RF) allocation signal; and
      transmit the allocation message to the requesting and target wireless communication devices.

3. The network managing device of claim 1, wherein the processing module determines the MFBMS capabilities of the requesting wireless communication device and of the target wireless communication device by at least one of:
   accessing a look up table;
   interpreting the baseband or near baseband request signal to obtain the MFBMS capabilities of at least one of the requesting and target wireless communication devices; and
   querying at least one of the requesting and target wireless communication device for the MFBMS capabilities.

4. The network managing device of claim 1 further comprises:
   the MFBMS capabilities for at least one of the requesting and target wireless communication devices includes a listing a frequency bands in which the at least one of requesting and target wireless communication device is capable of operation and, for each frequency band in the listing of frequency bands, a listing of standards to which the at least one of requesting and target wireless communication device is compliant;
   wherein a standard within the listing of standards in a given frequency band of the listing of frequency bands includes at least one of the frequency band standards of the two frequency band standards.

5. The network managing device of claim 4, wherein each of the communication resources of the one and of the other one of the two frequency band standards comprises at least one of:
   at least one transmit channel;
   at least one receive channel;
   at least one transmit slot of a transmit channel; and
   at least one receive slot of a receive channel.

6. The network managing device of claim 1, wherein the processing module is further operable to:
   allocate at least one transmit communication resource of the one of the two frequency band standards for the first communication path; and
   allocate at least one receive communication resource of the other one of the two frequency band standards for the second communication path.

7. The network managing device of claim 6, wherein the processing module is further operable to:
   determine the MFBMS capabilities of a second requesting wireless communication device and a second target wireless communication device based on a second baseband or near baseband request signal;
   when the MFBMS capabilities of the second requesting wireless communication device and of the second target wireless communication device have the at least two frequency band standards in common:
      allocate at least one receive communication resource of the one of the two frequency band standards for a third communication path from the second requesting wireless communication device to the second target wireless communication device; and
      allocate at least one transmit communication resource of the other one of the two frequency band standards for a fourth communication path from the second target wireless communication device to the second requesting wireless communication device.

8. The network managing device of claim 1, wherein the processing module is further operable to:
   allocate at least one transmit communication resource of the one of the two frequency band standards for the first communication path;
   allocate at least one receive communication resource of the one of the two frequency band standards for the first communication path;
   allocate at least one receive communication resource of the other one of the two frequency band standards for the second communication path; and
   allocate at least one transmit communication resource of the other one of the two frequency band standards for the second communication path.

9. A transceiver comprises:
   a transmit section operable to:
      convert an outbound symbol stream into an outbound radio frequency (RF) signal in accordance with a first one of two frequency band standards; and
      transmit the outbound RF signal via a communication resource of the first one of the two frequency band standards;
   a receiver section operable to:
      receive an inbound RF signal via a communication resource of a second one of the two frequency band standards; and
      convert the inbound RF signal into an inbound symbol stream in accordance with the second one of the two frequency band standards; and a baseband processing module operable to:
   convert outbound data into the outbound symbol stream in accordance with the first one of the two frequency band standards; and
   convert the inbound symbol stream into inbound data in accordance with the second one of the two frequency band standards; and
   generate a capabilities message regarding multiple frequency band multiple standard (MFBMS) capabilities; and
wherein the transmitter section is further operable to:
   convert the capabilities message into an RF capabilities signal; and
   transmit the RF capabilities signal via at least one of a control communication resource, the communication resource of the first one of the two frequency band standards, and the communication resource of the second one of the two frequency band standards.

10. The transceiver of claim 9 further comprises:
the MFBMS capabilities including a listing of frequency bands in which the transceiver is capable of operation and, for each frequency band in the listing of frequency bands, a listing of standards to which the transceiver is compliant; and
wherein a standard within the listing of standards in a given frequency band of the listing of frequency bands includes at least one of the frequency band standards of the two frequency band standards.

11. The transceiver of claim 9, wherein each of the communication resources of the first one and of the second one of the two frequency band standards comprises at least one of:
at least one transmit channel;
at least one receive channel;
at least one transmit slot of a transmit channel; and
at least one receive slot of a receive channel.

12. A transceiver comprising:
a transmit section operable to:
   convert a first portion of an outbound symbol stream into a first outbound radio frequency (RF) signal in accordance with a first one of the two frequency band standards;
   convert a second portion of the outbound symbol stream into a second outbound radio RF signal in accordance with the first one of the two frequency band standards;
   transmit the first outbound RF signal via a transmit communication resource of the first one of the two frequency band standards; and
   transmit the second outbound RF signal via a receive communication resource of the first one of the two frequency band standards;
a receiver section operable to:
   receive a first inbound RF signal via a receive communication resource of a second one of the two frequency band standards;
   receive a second inbound RF signal via a transmit communication resource of the second one of the two frequency band standards;
   convert the first inbound RF signal into a first portion of an inbound symbol stream in accordance with the second one of the two frequency band standards; and
   convert the second inbound RF signal into a second portion of the inbound symbol stream in accordance with the second one of the two frequency band standards;
a baseband processing module operable to:
   convert outbound data into the outbound symbol stream in accordance with the first one of the two frequency band standards; and
   convert the first portion of the inbound symbol stream and the second portion of the inbound symbol stream into inbound data in accordance with the second one of the two frequency band standards.

13. A transceiver comprising:
a transmit section operable to:
   convert an outbound symbol stream into an outbound radio frequency (RF) signal in accordance with a first one of two frequency band standards;
   transmit the outbound RF signal via a receive communication resource and a transmit communication resource of the first one of the two frequency band standards;
a receiver section operable to:
   receive an inbound RF signal via a receive communication resource and a transmit communication resource of a second one of the two frequency band standards;
   convert the inbound RF signal into an inbound symbol stream in accordance with the second one of the two frequency band standards
a baseband processing module operable to:
   convert outbound data into the outbound symbol stream in accordance with the first one of the two frequency band standards; and
   convert the inbound symbol stream into inbound data in accordance with the second one of the two frequency band standards.

14. The transceiver of claim 13 further comprises:
the transmitter section, the receiver section, and the baseband processing module implemented on at least one integrated circuit.

15. An integrated circuit (IC) comprises:
a receiver section operable to:
   receive a wireless communication request from a requesting wireless communication device, wherein the wireless communication request includes identity of a target wireless communication device;
   convert the wireless communication request into a baseband or near baseband request signal; and
a baseband processing module operable to:
   determine multiple frequency band multiple standard (MFBMS) capabilities of the requesting wireless communication device and the target wireless communication device based on the baseband or near baseband request signal;
   when the MFBMS capabilities of the requesting wireless communication device and of the target wireless communication device have at least two frequency band standards in common:
     allocate a communication resource of one of the two frequency band standards for a first communication path from the requesting wireless communication device to the target wireless communication device; and
     allocate a communication resource of an other one of the two frequency band standards for a second communication path from the target wireless communication device to the requesting wireless communication device.

16. The IC of claim 15 further comprises:
the processing module generating an allocation message that identifies the first and second communication paths;
a transmitter section operable to:

convert the allocation message into a radio frequency (RF) allocation signal; and transmit the allocation message to the requesting and target wireless communication devices.

17. The IC of claim 15, wherein the baseband processing module determines the MFBMS capabilities of the requesting wireless communication device and of the target wireless communication device by at least one of:

accessing a look up table;

interpreting the baseband or near baseband request signal to obtain the MFBMS capabilities of at least one of the requesting and target wireless communication devices; and querying at least one of the requesting and target wireless communication device for the MFBMS capabilities.

18. The IC of claim 15 further comprises:

the MFBMS capabilities for at least one of the requesting and target wireless communication devices includes a listing a frequency bands in which the at least one of requesting and target wireless communication device is capable of operation and, for each frequency band in the listing of frequency bands, a listing of standards to which the at least one of requesting and target wireless communication device is compliant;

wherein a standard within the listing of standards in a given frequency band of the listing of frequency bands includes at least one of the frequency band standards of the two frequency band standards.

19. The IC of claim 18, wherein each of the communication resources of the one and of the other one of the two frequency band standards comprises at least one of:

at least one transmit channel;

at least one receive channel;

at least one transmit slot of a transmit channel; and at least one receive slot of a receive channel.

20. The IC of claim 15, wherein the baseband processing module is further operable to:

allocate at least one transmit communication resource of the one of the two frequency band standards for the first communication path; and allocate at least one receive communication resource of the other one of the two frequency band standards for the second communication path.

21. The IC of claim 20, wherein the baseband processing module is further operable to:

determine the MFBMS capabilities of a second requesting wireless communication device and a second target wireless communication device based on a second baseband or near baseband request signal;

when the MFBMS capabilities of the second requesting wireless communication device and of the second target wireless communication device have the at least two frequency band standards in common:

allocate at least one receive communication resource of the one of the two frequency band standards for a third communication path from the second requesting wireless communication device to the second target wireless communication device; and allocate at least one transmit communication resource of the other one of the two frequency band standards for a fourth communication path from the second target wireless communication device to the second requesting wireless communication device.

22. The IC of claim 15, wherein the baseband processing module is further operable to:

allocate at least one transmit communication resource of the one of the two frequency band standards for the first communication path;

allocate at least one receive communication resource of the one of the two frequency band standards for the first communication path;

allocate at least one receive communication resource of the other one of the two frequency band standards for the second communication path; and allocate at least one transmit communication resource of the other one of the two frequency band standards for the second communication path.

* * * * *

UNITED STATES PATENT AND TRADEMARK OFFICE
CERTIFICATE OF CORRECTION

PATENT NO. : 8,107,890 B2
APPLICATION NO. : 12/328579
DATED : January 31, 2012
INVENTOR(S) : John Walley et al.

It is certified that error appears in the above-identified patent and that said Letters Patent is hereby corrected as shown below:

In the Claims:

Col. 11, line 55, in claim 3: replace "device" with --devices--
Col. 11, line 60, in claim 4: replace "listing a frequency bands" with --listing of frequency bands--
Col. 11, line 60, in claim 4: after "at least one of" insert --the--
Col. 11, line 61, in claim 4: replace "device" with --devices--
Col. 11, line 64, in claim 4: after "one of" insert --the--
Col. 11, line 65, in claim 4: replace "device" with --devices--
Col. 15, line 15, in claim 17: replace "device" with --devices--
Col. 15, line 18, in claim 18: replace "listing a frequency bands" with --listing of frequency bands--
Col. 15, line 19, in claim 18: before "requesting" insert --the--
Col. 15, line 19, in claim 18: replace "device" with --devices--
Col. 15, line 22, in claim 18: after "at least one of" insert --the--
Col. 15, line 23, in claim 18: replace "device" with --devices--

Signed and Sealed this
Thirtieth Day of April, 2013

Teresa Stanek Rea
*Acting Director of the United States Patent and Trademark Office*